July 1, 1969  RYUTARO KANEKO ET AL  3,452,687
AUTOMATIC MOLDING APPARATUS FOR RING-SHAPED
DOUGHNUTS ENCLOSING FILLINGS
Filed March 27, 1967

INVENTORS:
RYUTARO KANEKO
YOSHIO KANEKO

BY Eliot S. Gerber
ATTORNEY

FIG. 5-a
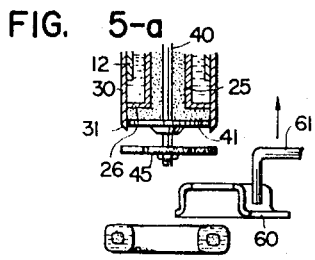
FIG. 5-b
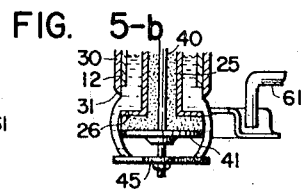
FIG. 5-c
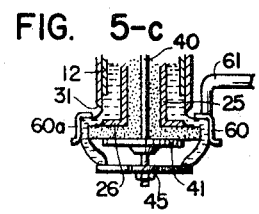
FIG. 5-e
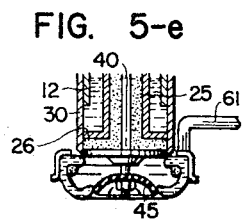
FIG. 5-d
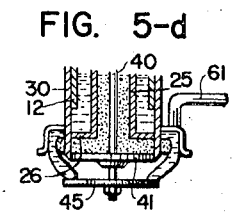
FIG. 5-f
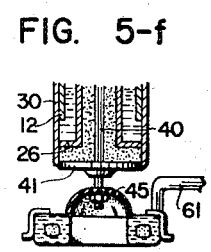
FIG. 6-a
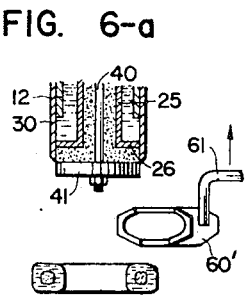
FIG. 6-b
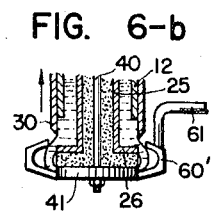
FIG. 6-c
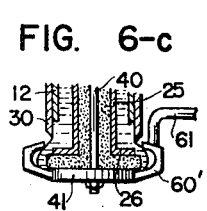
FIG. 6-d
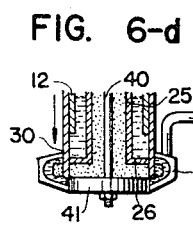
FIG. 6-e
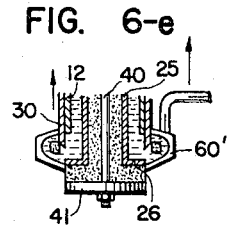
FIG. 6-f
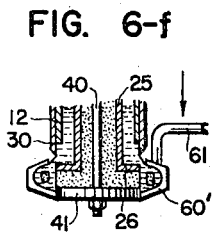
FIG. 6-g
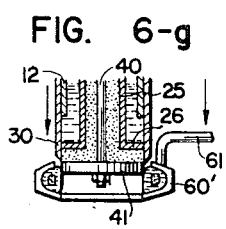
FIG. 6-h
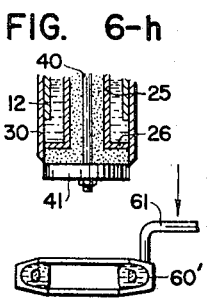
INVENTORS:
RYUTARO KANEKO
YOSHIO KANEKO
BY Eliot S. Gerber
ATTORNEY

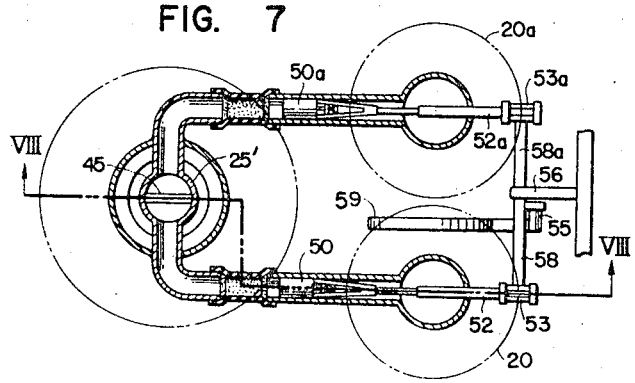
FIG. 7
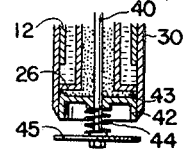
FIG. 9
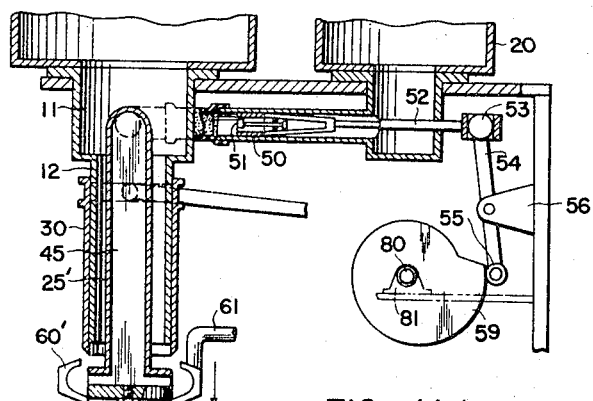
FIG. 8
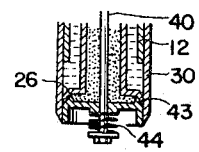
FIG. 10
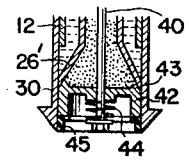
FIG. 11-a
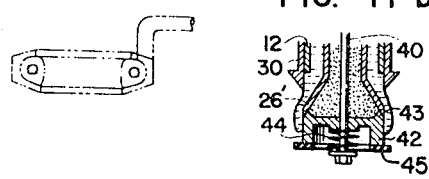
FIG. 11-b
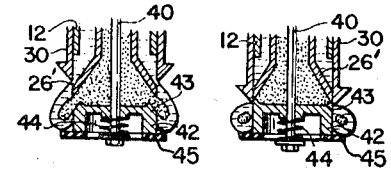
FIG. 11-c   FIG. 11-d
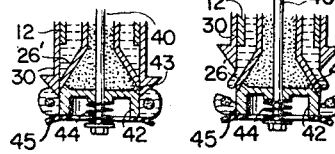
FIG. 11-e
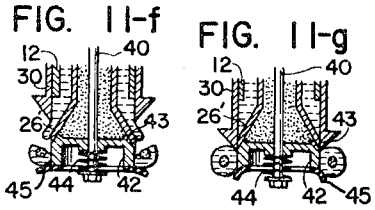
FIG. 11-f   FIG. 11-g
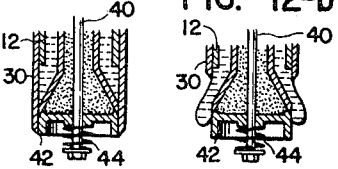
FIG. 12-a   FIG. 12-b
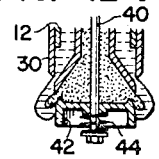
FIG. 12-c
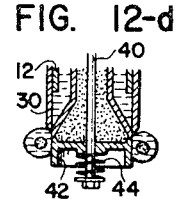
FIG. 12-d
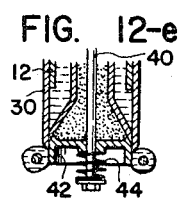
FIG. 12-e
INVENTORS:
RYUTARO KANEKO
YOSHIO KANEKO
BY Eliot S. Gerber
ATTORNEY United States Patent Office 3,452,687
Patented July 1, 1969

3,452,687
AUTOMATIC MOLDING APPARATUS FOR RING-SHAPED DOUGHNUTS ENCLOSING FILLINGS
Ryutaro Kaneko and Yoshio Kaneko, Yokohama-shi, Japan; said Yoshio Kaneko assignor to said Ryutaro Kaneko, Kanagawa-ken, Japan
Filed Mar. 27, 1967, Ser. No. 626,205
Claims priority, application Japan, Sept. 9, 1966, 41/59,195
Int. Cl. A21c 9/06
U.S. Cl. 107—1                          11 Claims

ABSTRACT OF THE DISCLOSURE

A machine producing a ring-shaped doughnut having one or more internal annular fillings. The uncooked doughnut dough and filling are stored in separate air-pressurized hoppers. The machine causes the dough, at predetermined timed intervals, to be squeezed out between two cylindrical pipes which form an annular opening. The filling, such as cream or jam, is caused to flow, also at predetermined intervals, from an annular opening which is positioned within the hole of the partly formed doughnut shaped dough. The machine then completely closes the dough around the filling and drops the formed, but uncooked doughnut. The doughnut is then cooked.

---

This invention relates to apparatus for molding ring-shaped doughnuts and more particularly to automatic molding apparatus for enclosing fillings in the annular center portions of ring-shaped doughnuts.

An abstract of the invention is as follows: A ring-shaped doughnut is produced having one or more internal annular fillings. The uncooked doughnut dough and filling are stored in separate air-pressurized hoppers. The machine causes dough, at predetermined timed intervals, to be squeezed out between two cylindrical pipes which form an annular opening. The filling, such as cream or jam, is caused to flow, also at predetermined intervals, from an annular opening which is positioned within the hole of the partly formed doughnut shaped dough. The machine then completely closes the dough around the filling and drops the formed, but uncooked, doughnut. The doughnut is then cooked.

The conventional doughnut, containing a filling, is made one-by-one by hand. It is in the form of a small roll or a so-called "bean-jam bread," i.e., without a hole. Such doughnuts are not made in the form of a ring. Consequently, their central core portion will not be well fried, the frying time will be long, the taste will be impaired, an excess of frying oil will be absorbed and it will be uneconomical. In some cases, a doughnut material fried in the form of a small bread or roll is filled, after being cooked, with a filling by means of an injector or by cutting a part of it. However, as it is still made by hand, the efficiency is very low.

An objective of the present invention is to provide an automatic doughnut molding apparatus for enclosing a filling correctly and uniformly in the annular center portion of a ring-shaped doughnut material.

Another objective of the present invention is to provide an automatic doughnut molding apparatus for enclosing two or more kinds of fillings, correctly and uniformly, in the annular center portion of a ring-shaped doughnut material.

It has been found that if the dough ring enclosing a filling is fried with oil and if the joined surfaces of the dough ring are not joined integrally, the dough is apt to crack in the joint. If a doughnut is cracked on the surface, not only both its appearance and taste will be impaired but also the consumption and replacement of the oil will be accelerated with an undesirable result.

It is therefore a further objective of the present invention to provide an automatic doughnut molding apparatus wherein, in case a ring-shaped doughnut is fried with oil, it will not crack on its surface.

The automatic doughnut molding apparatus according to the present invention is provided with hoppers containing, respectively, a properly prepared dough material and filling. The material and filling are pressed, with compressed air, under a proper pressure. A filling outlet pipe, connected with the hopper for the filling, is arranged in the center portion of a vertical dough material outlet pipe, which is connected with the dough hopper. A flange, having a fixed clearance from the end of the dough outlet pipe, is fixed to the end of the filling outlet pipe to form an annular outflow port for the dough. The outside diameter of the flange is equal to that of the dough outlet pipe. A sleeve having a blade edge at the tip is fitted around the dough material outlet pipe so that, when the sleeve rises and falls, the dough outflow port may be opened and closed and the outflow of the dough may be cut.

An annular delivery port for the filling is formed below the dough outflow port. This annular delivery port for the filling may be formed by fixing a disk having a fixed clearance from the flange or may be a cylindrical valve body which is fitted slidably on a supporting shaft secured in the center of the filling outlet pipe and which is resiliently pressed against the flange by a spring. The outside diameter of the disk or the cylindrical valve body is made equal to that of the dough material outlet pipe. In the case of the former, with the rise and fall of the sleeve, the filling delivery port will be opened and closed and the delivery of the filling will be cut. In the latter, with the pressure difference between the filling and the spring on the cylindrical valve body, the cylindrical valve body itself will move to cut the delivery of the filling. In either case, the filling conduit pipe is fitted with a piston provided with a one-way valve which will close to push out the filling when the piston advances but will open to pass the filling when the piston retreats. The filling will be thus delivered only at the time of the advance of the piston.

In order to make it easier to understand the present invention and its objects and features, the invention shall be explained in detail in the following, with reference to the accompanying drawings, in which similar parts are represented by the same corresponding reference numerals.

In the drawings:

FIGS. 5a–5f are explanatory views showing doughnut molding operations in the first embodiment in turn;

FIGS. 6a–6h are explanatory views showing molding operations in the second embodiment in turn;

FIG. 7 is a sectioned plan view of the apparatus in the case of enclosing two kinds of fillings;

FIG. 8 is a sectioned elevation taken along line VIII—VIII in FIG. 7; and

FIGS. 9 and 10 are sectioned views showing the essential parts of the embodiments in FIGS. 1 and 6a–6h, respectively.

Figure 1:
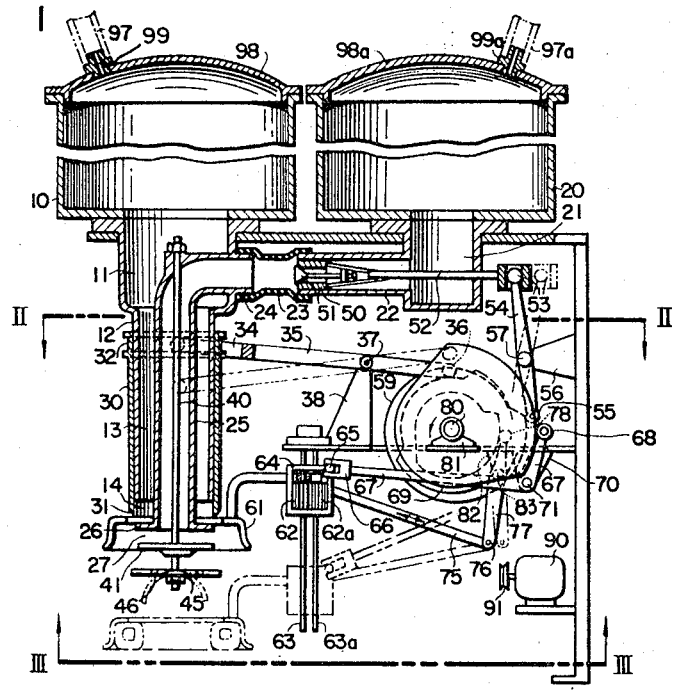
FIG. 1 is a side view of the first embodiment of the present invention, showing the essential parts in section.

First of all, the first embodiment illustrated in FIGS. 1 to 5 shall be explained. A sleeve 30, slidable up and down, is fitted to the outside of an outlet pipe 12 which is connected with an opening 11 in the bottom of a hopper 10 for a doughnut dough material. The lower end edge of the sleeve 30 has a blade edge 31 and an annular groove 32 which is provided at the upper end of the sleeve. A filling outlet pipe 25 is positioned in the center of the inside of the material outlet pipe 12 so that the space between the two pipes forms passage 13 for the dough material. A cutting blade flange 26, of an outside diameter equal to the outside diameter of the pipe 12, is secured to the lower end of the pipe 25 with a fixed clearance from the lower end of the pipe 12 so as to form an outlet 14 for the material. A supporting shaft 40 is provided in the center of the pipe 25. A cutting blade disk 41, of an outside diameter equal to the outside diameter of the pipe 12, is secured to the lower portion of said supporting shaft 40 with a fixed clearance from the cutting blade flange 26 so as to form a filling outlet 27. An elastic disk 45, high in the flexibility and having several radial notches 46, is fixed to the lowest end of the supporting shaft 40. A conduit pipe 22 is connected with an opening 21 in the bottom portion of a hopper 20. Hopper 20 is used for the filling and is connected through a connecting pipe 23 with an opening 24 in the upper portion of the filling outlet pipe 25. A piston 50 is fitted in the opening 24. A one-way valve 51, which closes to push out the filling when the piston advances but opens to pass the filling when the piston retreats, is fitted in the center of the piston. A piston rod 52 projects out through the conduit pipe 22 (for the filling) and has an engaging step part 53 at its end.

A motor 90, speed change gear 92 and compressor 96 are fixed to the machine base. A belt pulley 91, on the output shaft of the motor, and a belt pulley 93, on the input shaft of the speed change gear, are connected with each other through a belt, not illustrated. A crank pin 94 is fixed to the pulley 93 and is connected with a piston rod 95 of the compressor 96, see FIG. 2. Compressed air generated in the compressor is led to compressed air inlet holes 99 and 99a provided, respectively, in upper covers 98 and 98a of the hoppers 10 and 20, see FIG. 1. The compressed air is led through respective conduit pipes 97 and 97a and through a receiver and pressure regulating valve (not illustrated) so as to apply a fixed pressure from above onto the material and filling within their respective hoppers.

Figure 2:
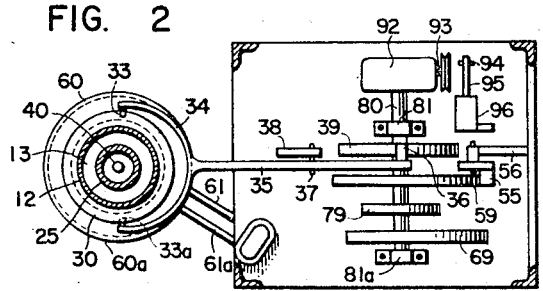
FIG. 2 is a sectional plan view on line II—II in FIG. 1 as seen in the direction indicated by the arrow.
Figure 3:
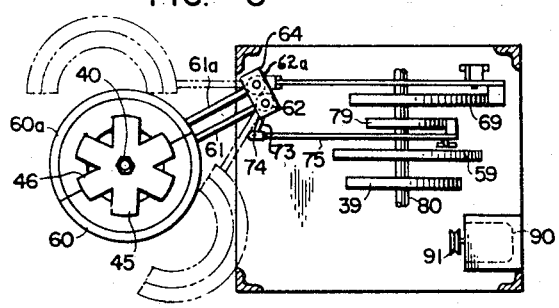
FIG. 3 is a plan view on line III—III in FIG. 1 as seen in the direction indicated by the arrow, the hopper device being omitted.
Figure 4:
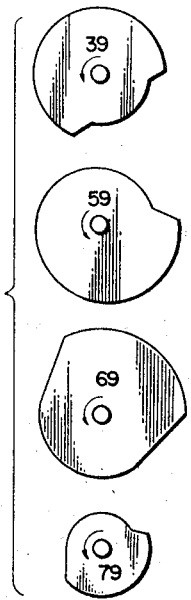
FIG. 4 shows profiles of four cams used in the first embodiment.

The output shaft of the speed change gear 92 is connected with a main shaft 80 borne by two bearings 81 and 81a in the machine base, see FIG. 2. Four groove cams 39, 59, 69 and 79, having the profiles shown in FIG. 4, are fixed to the main shaft 80.

The cam 39, for elevating and lowering the sleeve 30, engages with a roller 36 at the end of a lever 35. The lever 35 is rockably pivoted on a pivot 37 on a metal fixture 38 fixed to the machine base. Rollers 33 and 33a, fitting in the groove 32 of the sleeve 30, are rotatably attached to a fork 34 at the other end of the lever 35. The cam 59, for the reciprocation of the piston 50, engages with a roller 55 at the end of a lever 54. The lever 54 is rockably pivoted on a pivot 57 on a metal fixture 56 fixed to the machine base. The lever 54 engages at the other end with an engaging step part 53 of the piston rod 52.

The cam 69, for elevating and lowering the two-split molding bowls 60 and 60a, engages with a roller 68 at the end of a lever 67. The bowls 60 and 60a, when closed, form a complete ring mold. The lever 67 is rockably pivoted on a pivot 71 on a metal fixture 70 fixed to the machine base. A fork part 66 at the other end of the lever 67 engages with a projection 65 in the upper portion of a case 64. Two long guide shafts 63 and 63a are within this case 64. The guide shafts 63 and 63a are vertically fixed to the machine base, are loosely fitted within the case, and have pinions 62 and 62a, respectively. The pinions mesh with each other. Arm rods 61 and 61a, attached to the two-split molding bowls 60 and 60a, are secured respectively to the bosses of these two pinions.

The lowered position of the case 64 and the split bowls 60 and 60a are shown in dashed outline in FIG. 1. The open position of the split bowls 60 and 60a is shown in dashed outline in FIG. 3. The cam 79, for opening and closing the two-split molding bowls, engages with a roller 78 at one end of a lever 77. Lever 77 is rockably pivoted on a pivot 83 on a metal fixture 82 fixed to the machine base. The lever 77 is pivoted at the other end to one end of a connecting rod 75 through a pin 76. This connecting rod 75 is connected at the other end with an arm 73 fixed to the boss of one pinion 62 through a ball joint 74. When arm 73 turns pinion 62, and its meshed pinion 62a, the bowls 60 and 60a will open or close together.

Thus, the following four operations can be made in any desired time relation, and can be repeated, by making the proper cam profiles and the proper relative arrangement of the cams with one another: (1) the reciprocation of the piston 50 or, in other words, the delivery of the filling; (2) the rise and fall of the sleeve 30 or, in other words, the delivery of the dough material and the cutting of the delivered dough material and filling; (3) the rise and fall of the two-split molding bowls 60 and 60a along the axis of the sleeve; and (4) the opening and closing of said two-split molding bowls, so as to open to the right and left and surround the outside of the sleeve.

The operation of the apparatus is as follows: A properly prepared dough material and filling are put into the respective hoppers 10 and 20 and the covers 98 and 98a are fitted to the hoppers. Then the motor 90 is rotated to operate the speed change gear 92 and compressor 96. Generated compressed air has its pressure properly regulated and is then introduced into the hoppers to apply a pressure onto the material and filling from above. The operation of the speed change gear 92 will rotate the main shaft 80. At first, the sleeve 30 is in the lowest position and the respective outlets for the material and filling are closed. While the two-split molding bowls 60 and 60a are opened, the sleeve 30 will begin to rise (FIG. 5a). Then, when the sleeve 30 begins to rise, the lower end of the dough outflow material tube will come into contact with the elastic disk 45 (FIG. 5b). Then the molding bowls which have risen will be closed. At this time, the piston 50 will operate to deliver the filling and the bowls will receive the swollen dough material portion (FIG. 5c). Then, the sleeve 30 will begin to lower to shut off and cut the dough material and filling from the feeding sides (FIG. 5d). The bowls will lower as closed and the lower end of the dough material tube will be rolled inward (FIG. 5e). The bowls will further lower and the inside surface of the dough material ring will be rubbed with the outer edge portion of the elastic disk (FIG. 5f). When the bowls have lowered to the lowest position, they will be opened to the right and left, the material ring will be taken away and the above-mentioned operation will be repeated again.

In this embodiment, the filling is annularly delivered to the inside hole of a ring of dough. The dough has been caused to flow out of an annular outlet. When the dough flows out of the annular outlet, the lower end portion of the ring of the dough will be shrunk in form due to its surface tension. Further, when the filling is annularly delivered to the inside of the ring of dough, it will swell outward. It is possible to mold the dough enclosing the annular filling by using (1) a disk made of a flexible elastic material and having a size large enough to receive the lower end portion of the ring of the dough, and (2) two-split molding bowls to receive the swollen portion of the material. These two-split molding bowls can be opened and closed so that, when they are closed, they may rise and fall along the axis of the sleeve while surrounding the outside of the sleeve from both sides.

Preferably the two-split molding bowls have cross-sections which form an annular space opened on the lower end surface when they surround the sleeve from both sides. The dough, swollen by the delivery of the filling, will be received by the inside surfaces of those two-split molding bowls. The sleeve will be lowered and the dough and filling will be cut and shut off from the feeding sides. The bowls will then be lowered, but the dough deposited on the elastic disk will not separate, even if the elastic disk curves downward under the weight of the dough. Therefore, with the further fall of the bowls, the lower end portion of the dough tube will be rolled inward and will be finally rubbed with the outer edge portion of the elastic disk so as to be molded in its final annular ring shape, having about a circular cross-section.

FIGS. 6a–6h show another embodiment wherein the surface of the hole in the doughnut in the above-mentioned embodiment is shaped by elevating and lowering the sleeve and molding bowls again instead of using the elastic shaping disk. Except that the profiles of the cam 39 for elevating and lowering the sleeve and the cam 69 for elevating and lowering the molding bowls are different from those of FIG. 4, all the other parts are of the same structure as in the above-mentioned embodiment except for the hereinafter described construction of the mixing bowls. Its operation is as follows: As soon as the sleeve 30 in the lowest position in FIG. 6a begins to rise and the material begins to flow out, the two-split molding bowls 60' which have risen as opened will close (FIG. 6b), then the filling will be delivered (FIG. 6c) and then the sleeve 30 will lower and will cut the material and filling with its blade edge (FIG. 6d), just the same as in the preceding embodiment. In the present embodiment, then the sleeve 30 and the two-split molding bowls 60' as closed will rise again (FIG. 6e), then only the two-split molding bowls will lower (FIG. 6f), the material will be newly fed from the lower portion to the upper portion within the bowls, then the sleeve 30 will lower to stop the outflow of the material and further the bowls will lower (FIG. 6g) and will open in a fixed position (FIG. 6h).

In the embodiment of FIGS. 6a–6h, the two-split molding bowls have cross-sections which form a closed annular space when they surround the sleeve from both sides. The dough, swollen by the delivery of the filling, will be received by the inside surfaces of these two-split molding bowls and then the bowls may be further filled with the dough to be molded.

FIGS. 7 and 8 show the third embodiment wherein two kinds of fillings are to be enclosed in the annular center portion of a doughnut. As evident from the drawings, the hoppers 20 and 20a, respectively, containing two kinds of fillings, are connected to the filling outlet pipe 25' which is divided into two sections with a partition wall 45. The pistons 50 and 50a, provided with one-way valves 51 and 51a, are fitted in the respective pipe passages. The piston rods 52 and 52a project out through the respective pipe passage walls. The forked arms 58 and 58a of the lever 54 engage respectively with the engaging step parts 53 and 53a formed at the ends of the respective rods. Said lever 54 engages at the other end with the cam 59 fixed to the main shaft 80. Except for these differences, this embodiment is the same as the above-mentioned embodiment. When the present embodiment is operated in the same manner as in the above-mentioned embodiment, the different fillings will be able to be enclosed in the respective half peripheries in the annular center portion of the doughnut. Each of the fillings will be in the form of a C.

In the fourth embodiment, in FIG. 9, and the fifth embodiment, in FIG. 10, a cutting blade cylinder 42, resiliently pressed by a spring 44, is fitted to the tip end portion of the supporting shaft 40. The peripheral edge 43 at the upper end of said cutting blade cylinder 42 is in close contact with the peripheral edge of the back surface of a flat plate-shaped cutting blade flange 26. The filling will be delivered when the piston 50 operates to push down the cutting blade cylinder 42 against the force of the spring 44. The delivered filling will be cut and shut off when the cutting blade cylinder 42 is returned by the force of the spring 44 just after the delivery. In this point, this embodiment is different from the already described first and second embodiments. Otherwise the fourth embodiment is the same as the first embodiment and the fifth is the same as the second. The operation of the fifth embodiment is substantially the same and therefore shall not be detailed here.

The sixth embodiment of FIGS. 11a–11g is different from the above two embodiments in the respects that (1) the cutting blade flange 26' is conical, (2) the cutting blade cylinder 42 is resiliently pressed by the spring 44 and is in contact with said cutting flange 26', (3) an elastic disk 28 having notches is secured to the lower surface of the cutting blade cylinder 42, and (4) the two-split molding bowls and their elevating and lowering and opening and closing mechanisms can be entirely omitted. The molding procedure in this sixth embodiment is as follows: First of all, when the sleeve 30, in the state shown in FIG. 11a, is elevated, the material will flow out along the surface of the cutting blade cylinder 42 (FIG. 11b). Then the piston will be operated, the cutting blade cylinder 42 will be pushed down against the force of the spring 44 and a fixed amount of the filling will be delivered within a short time (FIG. 11c). Just after the delivery of the filling, the cutting blade cylinder 42 will be returned to the original state by the spring 44. At this time, the delivered filling will be cut and shut off. The sleeve 30 will be lowered and the outflow of the material will be stopped. The sleeve will be further lowered and the formed dough material ring will be received on the elastic disk (FIG. 11d). Then the sleeve 30 will be lowered so that the inclined surface at its edge may hit into the dough material ring and the filling within may be exposed (FIG. 11e). Then the sleeve 30 will rise once again so as to cover the lacking part with the dough material (FIG. 11f) and will finally lower again to pull off the formed dough material ring (FIG. 11g).

The elastic disk 28 is secured to the lower surface of the cutting blade cylinder so that the dough ring, swollen out by the delivery of the filling, may be supported on the elastic disk. The dough ring is once lightly pressed with the inclined surface of the blade edge of the sleeve so that the enclosed filling may be partly exposed. The said exposed portion is then coated with the dough and the product is pulled off the elastic disk.

Lastly, the seventh embodiment in FIGS. 12a–12e of the most simplified structure. In this seventh embodiment, the elastic disk (used in the sixth embodiment) is omitted. Its operation is as follows: First of all, when the sleeve 30 (in the state shown in FIG. 12a) is elevated, the material will be made to flow out rather thickly along the surface of the cutting blade cylinder 42 (FIG. 12b). Then the filling will be delivered (FIG. 12c). It is the same as is mentioned above, that, just after the delivery, the cutting blade cylinder will return to the original state and the filling will be cut and shut off. On the other hand, the sleeve 30 is lowered to cut and shut off the material (FIG. 12d). The material ring thus formed on the cutting blade cylinder will be pulled away when the sleeve lowers further (FIG. 12e).

In FIGS. 12a–12e the cutting blade flange is made conical instead of a flat plate. The dough is able to flow down along the surface of the cutting blade cylinder. Therefore, if the dough is made to flow out rather thickly and a fixed amount of the filling is annularly delivered at once from the inside of the tube of the material which has flowed out, the filling will be able to be embedded into the rather thick dough without separating the dough from the surface of the cutting blade cylinder. Therefore, when the sleeve is lowered and this dough ring is pulled off, the molding of the annular ring will be able to be made. In this embodiment, both of the elastic disk and the two-split molding bowls are entirely eliminated.

Any known cam and link mechanisms can be applied to the above-mentioned rising and falling motion of the sleeve, advancing and retreating motion of the piston rod and rising and falling and opening and closing motions of the two-split molding bowls so that any desired motions may be made in the time relation with one another.

The apparatus of the present invention can be used for both cake doughnuts and yeast doughnuts by properly adjusting the compressed air pressure applied to the material surface within the hopper. Various fillings may be used, such as jam or creams or puddings. In the case of using the present apparatus for making cake doughnuts, the apparatus should be fitted preferably above a frier so that the molded doughnuts may be immediately fried with oil. In such case, it is desirable that the two-split molding bowls are lined with polytetrafluoroethylene, such as DuPont's "Teflon," and that the elastic disk is made of silicone rubber, which is a heat-proof material. In the case of using the apparatus for making yeast doughnuts, it is preferable to fit it above a conveyor connected to the next step.

In the apparatus of the present invention, not only one but also two or more kinds of fillings can be enclosed in the annular center portion of one doughnut. For that purpose, if hoppers for the respective fillings are provided, independent pipe passages are provided so that the fillings do not mix with each other.

The pipes are joined to openings in the bottoms of the respective hoppers. Piston devices, operating simultaneously, are fitted in the respective filling pipe passages. The other parts may be exactly the same as in the apparatus for enclosing a single filling. Thus, for example, a doughnut in which two types of jam are enclosed in the respective half peripheries can be obtained.

The apparatus of the present invention may be made with a cutting blade cylinder which is normally resiliently pressed by a spring against the cutting blade flange. The cutting cylinder is fitted, preferably to the lower end of a supporting shaft provided in the center portion of the filling outlet pipe. Under the filling pressure (generated when the piston provided in the filling outlet pipe operates) said cutting blade cylinder will be lowered for a short time against said spring and will form an annular outlet so that a fixed amount of the filling may be delivered. When the filling pressure within the pipe is reduced, the cutting blade cylinder will be returned to the original state by said spring pressure and will cut and shut off the delivered filling. Thus, the filling will be delivered, cut and shut off independently of the delivery, cut and shut off of the dough. Therefore, the dough of the joined surfaces of the dough ring will be joined together so integrally that, in case the molding is fried with oil, it will not crack in its joined portion.

In the above are shown only preferable embodiments of the present invention.

What is claimed is:

1. An automatic molding apparatus for producing ring doughnuts enclosing fillings, comprising respective hoppers adapted for a dough material and for a filling, a material outlet pipe connected with said hopper for the dough material, a filling outlet pipe connected with said hopper for the filling and arranged in the center of said outlet pipe for the material, means to force said filling down said filling outlet pipe, a cutting flange having the same outside diameter as of said material outlet pipe and fixed to one end of said filling outlet pipe so as to form an annular material outflow port between it and said material outlet pipe, a delivery means connected with said filling pipe and having the same outside diameter as said material outlet pipe for forming an annular filling delivery port below said cutting flange, a sleeve fitted to be slidable up and down on the outer peripheral surface of said material outlet pipe and having a blade edge at its lower tip edge, and a mechanism for controlling said filling force means and elevating and lowering said sleeve in desired time relationships, wherein said means to force said filling includes a reciprocating piston fitted in a conduit pipe leading to said filling outlet pipe and wherein said piston is provided with a one-way valve which closes on its advance to push out said filling and opens on its withdrawal to pass said filling.

2. The apparatus according to claim 1 wherein said mechanism includes a motor driving a shaft, a plurality of cams on said shaft, rollers following said cams, and links connected to said rollers and also connected to said piston and said sleeve.

3. An automatic molding apparatus for producing ring doughnuts enclosing fillings, comprising respective hoppers adapted for a dough material and for a filling, a material outlet pipe connected with said hopper for the dough material, a filling outlet pipe connected with said hopper for the filling and arranged in the center of said outlet pipe for the material, means to force said filling down said filling outlet pipe, a cutting flange having the same outside diameter as of said material outlet pipe and fixed to one end of said filling outlet pipe so as to form an annular material outflow port between it and said material outlet pipe, a delivery means connected with said filling pipe and having the same outside diameter as said material outlet pipe for forming an annular filling delivery port below said cutting flange, a sleeve fitted to be slidable up and down on the outer peripheral surface of said material outlet pipe and having a blade edge at its lower tip edge, and a mechanism for controlling said filling force means and elevating and lowering said sleeve in desired time relationships and also including a plurality of molding bowls which close to form a ring mold and which surround the outside of the sleeve from both sides, and means to elevate and lower and open and close said bowls.

4. Apparatus as in claim 3 wherein the means for elevating and lowering and opening and closing said bowls is a cam and link mechanism which operates at predetermined times.

5. The apparatus according to claim 3 wherein said molding bowls have such cross-sections as will form a closed annular space when they surround the sleeve from both sides.

6. The apparatus according to claim 3 wherein said molding bowls have cross-sections which form an annular space opened on the lower end surface when they surround the sleeve from both sides.

7. The apparatus according to claim 3 wherein said cutting flange is made in the form of a flat plate, said means for forming a filling delivery port is a cutting blade disk secured with a fixed clearance from the cutting blade flange to the lower end of a supporting shaft provided in the center of the filling outlet pipe and said molding bowls surround the outside of the sleeve from both sides and can be elevated and lowered and opened and closed, and a mechanism for elevating and lowering and opening and closing said molding bowls in any desired time relation with reciprocating said piston.

8. The apparatus according to claim 7 wherein said molding bowls have such cross-sections as will form a closed annular space when they surround the sleeve from both sides.

9. The apparatus according to claim 7 wherein said molding bowls have such cross-sections as will form an annular space opened on the lower end surface when they surround the sleeve from both sides and have an elastic disk of such size as will receive the lower end portion of the outflow dough material with a proper clearance from and below said cutting blade cylinder.

10. An automatic molding apparatus for producing ring doughnuts enclosing fillings, comprising respective hoppers adapted for a dough material and for a filling, a material outlet pipe connected with said hopper for the dough material, a filling outlet pipe connected with said hopper for the filling and arranged in the center of said outlet pipe for the material, means to force said filling down said filling outlet pipe, a cutting flange having the same outside diameter as of said material outlet pipe and fixed to one end of said filling outlet pipe so as to form an annular material outflow port between it and said material outlet pipe, a delivery means connected with said filling pipe and having the same outside diameter as said material outlet pipe for forming an annular filling delivery port below said cutting flange, a sleeve fitted to be slidable up and down on the outer peripheral surface of said material outlet pipe and having a blade edge at its lower tip edge, and a mechanism for controlling said filling force means and elevating and lowering said sleeve in desired time relationships wherein there are provided a plurality of hoppers for fillings, as many pressure means as said hoppers, a plurality of separated filling outlets together forming an annular outlet, and a means for conveying said fillings from said hoppers to the filling outlets without mixing the fillings with each other.

11. An automatic molding apparatus for producing ring doughnuts enclosing fillings, comprising respective hoppers adapted for a dough material and for a filling, a material outlet pipe connected with said hopper for the dough material, a filling outlet pipe connected with said hopper for the filling and arranged in the center of said outlet pipe for the material, means to force said filling down said filling outlet pipe, a cutting flange having the same outside diameter as of said material outlet pipe and fixed to one end of said filling outlet pipe so as to form an annular material outflow port between it and said material outlet pipe, a delivery means connected with said filling pipe and having the same outside diameter as said material outlet pipe for forming an annular filling delivery port below said cutting flange, a sleeve fitted to be slidable up and down on the outer peripheral surface of said material outlet pipe and having a blade edge at its lower tip edge, and a mechanism for controlling said filling force means and elevating and lowering said sleeve in desired time relationship, wherein said cutting flange is made in the form of a flat plate and said means for forming a filling delivery port is a cutting blade cylinder which is fitted to the lower end of a supporting shaft provided in the center of the filling outlet pipe and wherein an elastic disk is fixed to the said supporting shaft below the said cutting blade cylinder.

References Cited
UNITED STATES PATENTS 2,643,620  6/1953  Miller.
3,362,355  1/1968  Roth.

ROBERT W. MICHELL, *Primary Examiner.*

JOSEPH SHEA, *Assistant Examiner.*

U.S. Cl. X.R.

99—86; 107—54